United States Patent [19]
Shih-Hung

[11] Patent Number: 6,022,157
[45] Date of Patent: Feb. 8, 2000

[54] KEY STRUCTURE OF A KEYBOARD FOR EASY GREASE INJECTION

[75] Inventor: Chao Shih-Hung, Taipei Hsien, Taiwan

[73] Assignee: Darfon Electronics Corp., Taoyuan, Taiwan

[21] Appl. No.: 09/182,289

[22] Filed: Oct. 27, 1998

[30] Foreign Application Priority Data

Jun. 26, 1998 [TW] Taiwan ................................. 87110338

[51] Int. Cl.[7] ....................................................... B41J 5/08
[52] U.S. Cl. ........................... 400/490; 400/495; 400/496
[58] Field of Search ..................................... 400/490, 491,
400/491.1, 491.2, 495, 495.1, 496; 200/5 A,
512, 513, 514, 515, 516, 517, 520, 341,
344, 345, 342, 343

[56] References Cited

U.S. PATENT DOCUMENTS

| | | | |
|---|---|---|---|
| 4,830,526 | 5/1989 | Hosono | 400/490 |
| 5,376,765 | 12/1994 | Holmes et al. | 200/344 |
| 5,669,723 | 9/1997 | Chang | 400/496 |
| 5,878,872 | 3/1999 | Tsai | 200/344 |

*Primary Examiner*—John Hilten
*Assistant Examiner*—Amanda B. Sandusky
*Attorney, Agent, or Firm*—Winston Hsu

[57] ABSTRACT

The present invention relates to a key structure of a keyboard for easy grease injection. The key structure comprises a top cover installed with a supporting structure, a key cap, and a link bar. The supporting structure comprises two hooks at two sides. Each hook comprises a plate structure on its top portion and a horizontal sliding slot below the plate structure. The key cap comprises two clamps installed on a bottom side of the key cap. The link bar comprises two upper ends installed in the two clamps, and two lower ends installed in the horizontal sliding slots. Each of the plate structures comprises an injection hole. The injection hole is positioned so that grease can be injected into the horizontal sliding slot below the plate structure through the injection hole so as to reduce the friction between one lower end of the link bar and the horizontal sliding slot of the hook when the lower end of the link bar slides in the horizontal sliding slot.

6 Claims, 8 Drawing Sheets

KEY STRUCTURE OF A KEYBOARD FOR EASY GREASE INJECTION

BACKGROUND OF THE INVENTION

1. Field of the Invention

The present invention relates to a keyboard, and more particularly, to a key structure of a keyboard for easy grease injection.

2. Description of the Prior Art

Figure 1:
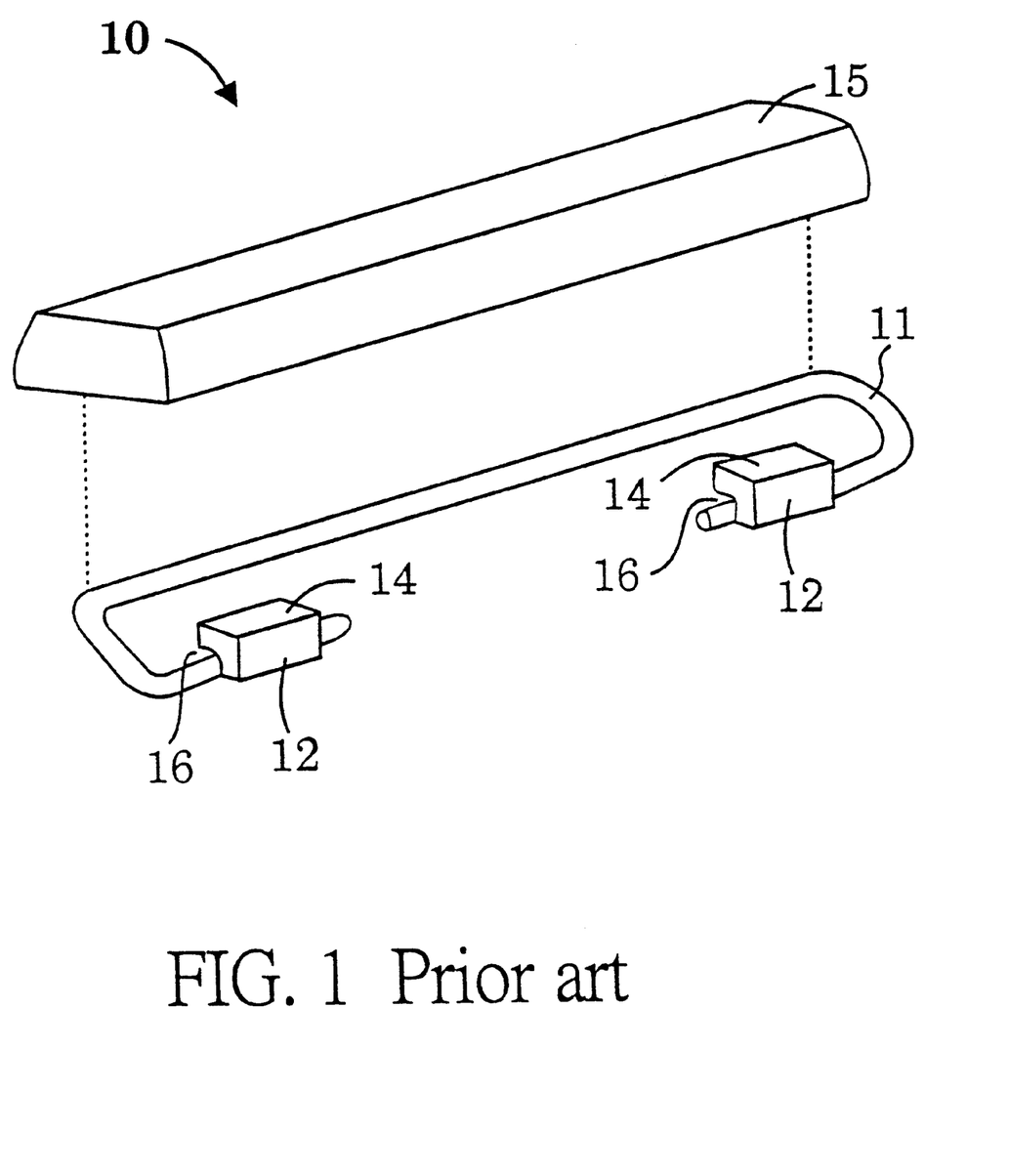
FIG. 1 is a perspective view of a prior art key structure.

Currently, large-sized keys of a computer keyboard such as the shift, enter or spacebar keys typically use a link bar to reduce key vibrations. Please refer to FIG. 1. FIG. 1 is a perspective view of a prior art key structure 10. The key structure 10 comprises a rectangular shaped key cap 15, two hooks 12 installed below the key cap 15, and a link bar 11 installed between the key cap 15 and the two hooks 12 for maintaining the balance of the key cap 15 during depression of the key cap 15.

There is a plate structure 14 with an underlying horizontal sliding slot 16 on top of each hook 12. Two ends of the bottom of the link bar 11 are positioned inside the horizontal sliding slots 16 of the hooks 12 in a front-and-rear slidable manner. The sliding slot 16 is coated with grease to reduce friction and noise generation by the link bar 11 when the key cap 15 is depressed. When applying the grease, a small stick covered with the grease must be repeatedly inserted into the sliding slots 16 in order to spread the grease into the sliding slots 16 evenly. Such repeated actions cause a lot of inconvenience when assembling the key structure 10.

SUMMARY OF THE INVENTION

It is therefore an objective of the present invention to provide a keyboard structure which can make grease injection an easy task.

In a preferred embodiment, the present invention provides a key structure of a keyboard having a top cover comprising:
- a key supporting structure installed on the top cover of the keyboard;
- two hooks installed on the top cover positioned on two opposite sides of the key supporting structure, each of the hooks comprising a plate structure on its top and a horizontal sliding slot under the plate structure;
- a key cap having a bottom end movably connected to the key supporting structure in an up-and-down manner, the key cap further comprising two clamps on its bottom side;
- a link bar comprising two upper ends and two lower ends integrally built together, the two upper ends being rotatably installed in the two clamps on the bottom side of the key cap, the two lower ends being separately installed in the horizontal sliding slots of the two hooks on the top cover in a slidable manner, the link bar being used for maintaining balance of the key cap when the key cap is depressed;
- wherein the plate structure of at least one of the two hooks comprises an injection hole through which grease can be injected into the horizontal sliding slot under the plate structure so as to reduce the friction between the horizontal sliding slot and the lower end of the link bar in the horizontal sliding slot.

It is an advantage of the present invention that the grease can be easily injected into the horizontal sliding slot of a hook through the injection hole at the plate structure or the bottom opening of the hook therefore making the installation of the key structure a very simple task.

These and other objectives of the present invention will no doubt become obvious to those of ordinary skill in the art after reading the following detailed description of the preferred embodiment which is illustrated in the various figures and drawings.

DETAILED DESCRIPTION OF THE PREFERRED EMBODIMENT

Figure 2:
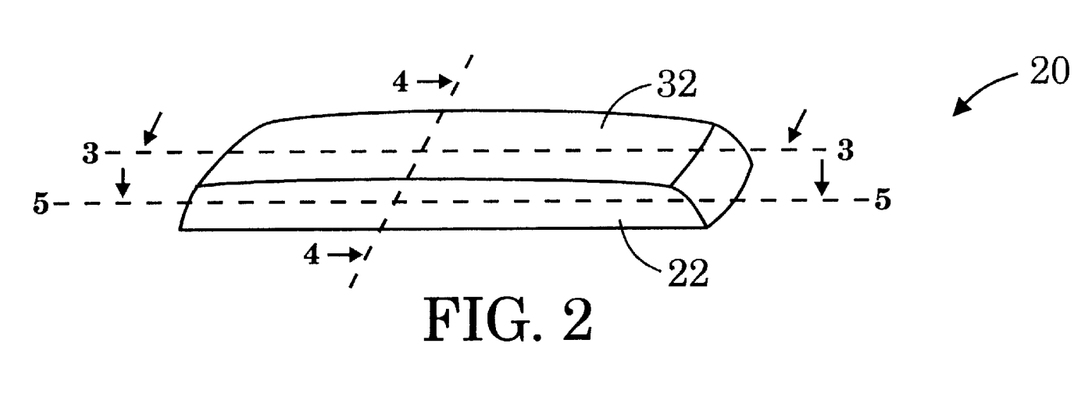
FIG. 2 is a perspective view of a key structure according to the present invention.
Figure 3:
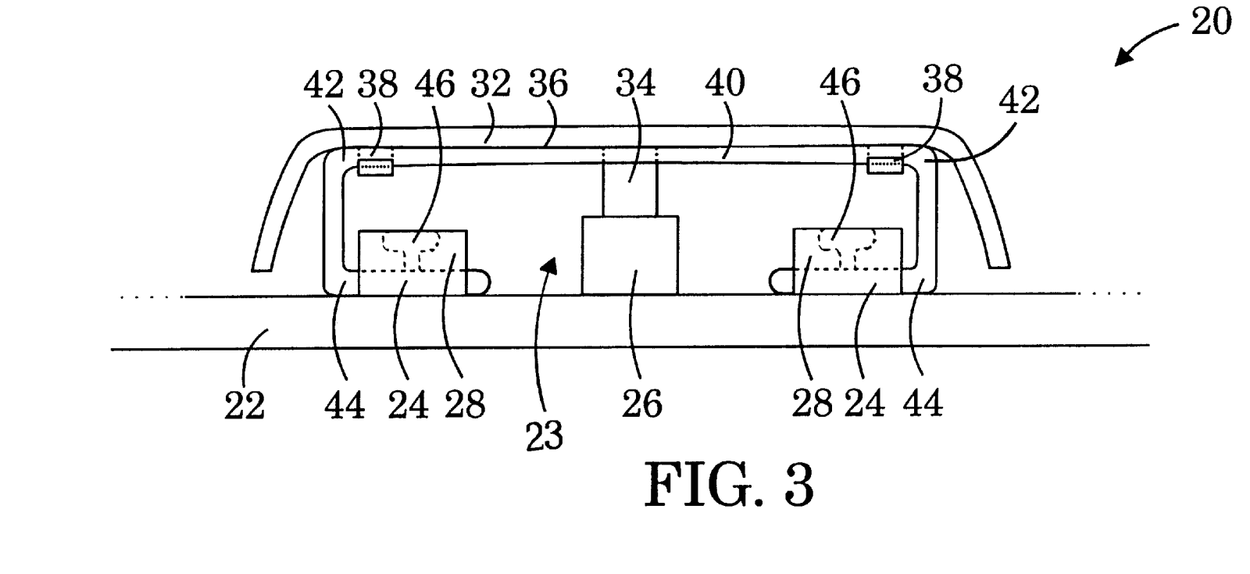
FIG. 3 is a sectional view along line 3—3 of the key structure in FIG. 2.
Figure 4:
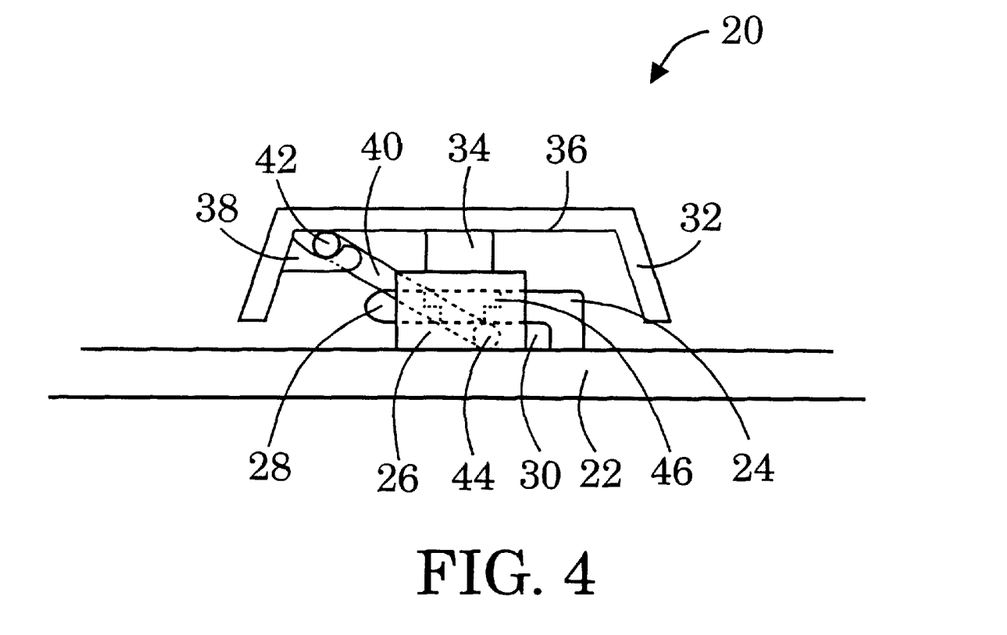
FIG. 4 is a sectional view along line 4—4 of the key structure in FIG. 2.
Figure 5:
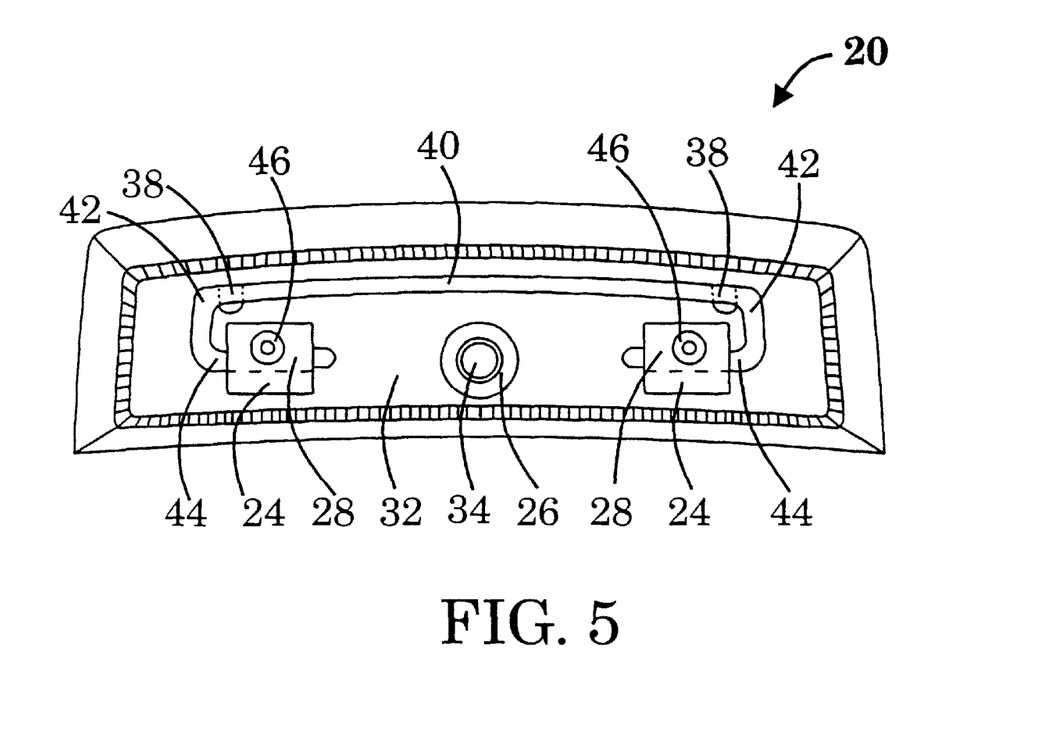
FIG. 5 is a sectional view along line 5—5 of the key structure in FIG. 2.

Please refer to FIGS. 2 to 5. FIG. 2 is a perspective view of a key structure 20 according to the present invention. FIG. 3 is a sectional view along line 3—3 of the key structure 20. FIG. 4 is a sectional view along line 4—4 of the key structure 20. FIG. 5 is a sectional view along line 5—5 of the key structure 20.

The key structure 20 comprises a top cover 22, a key supporting structure 23 installed on the top cover 22, two hooks 24 installed at left and right sides of the key supporting structure 23, a rectangular shaped key cap 32, and a link bar 40 installed between the top cover 22 and the key cap 32. The key supporting structure 23 comprises a vertical sliding slot 26 installed at a middle portion of the top cover 22, and a vertical sliding rod 34 installed in the vertical sliding slot 26 in an up-and-down slidable manner. Each of the hooks 24 comprises a plate structure 28 installed on its top portion, and a horizontal sliding slot 30 formed between the hook 24 and the top cover 22. The key cap 32 comprises a rectangular recess defined by two long sides arranged in a left-right direction and two short sides arranged in a front-and-rear direction on an inner side 36 of the key cap 32. One of the two long sides is installed with two clamps 38 at left and right sides of the vertical sliding rod 34. The link bar 40 comprises two upper ends 42 and two lower ends 44 integrally built together, the two upper ends 42 being rotatably installed on the two clamps 38 of the key cap 32, and two lower ends 44 being separately installed in the horizontal sliding slots 30 on the top cover 22 in a front-and-rear slidable manner for maintaining the balance of the key cap 32 when the key cap 32 is depressed.

Figure 5A:
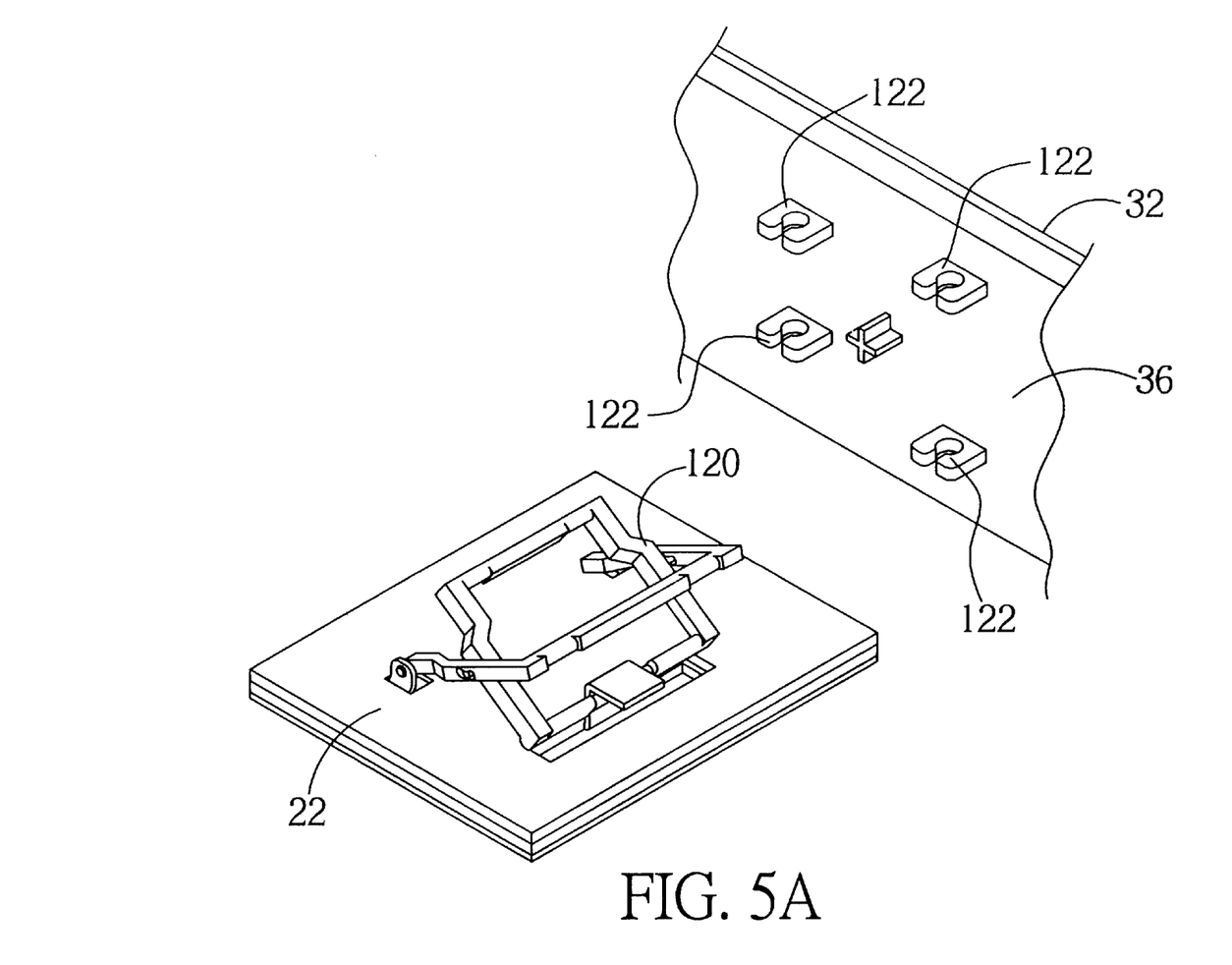
FIG. 5A is a schematic view of an alternative key structure according to the present invention.

Please refer to FIG. 5A. FIG. 5A is a schematic view of an alternative key structure according to the present invention. The key structure comprises a scissors-shaped frame 120 installed between the two hooks 24 in an up-and-down moveable manner on the top cover 22, and four clasps 122 are installed on the inner side 36 of the key cap 32 for fastening the scissors-shaped frame 120 to allow the key cap 32 to move up and down on the top cover 22.

Figure 6:
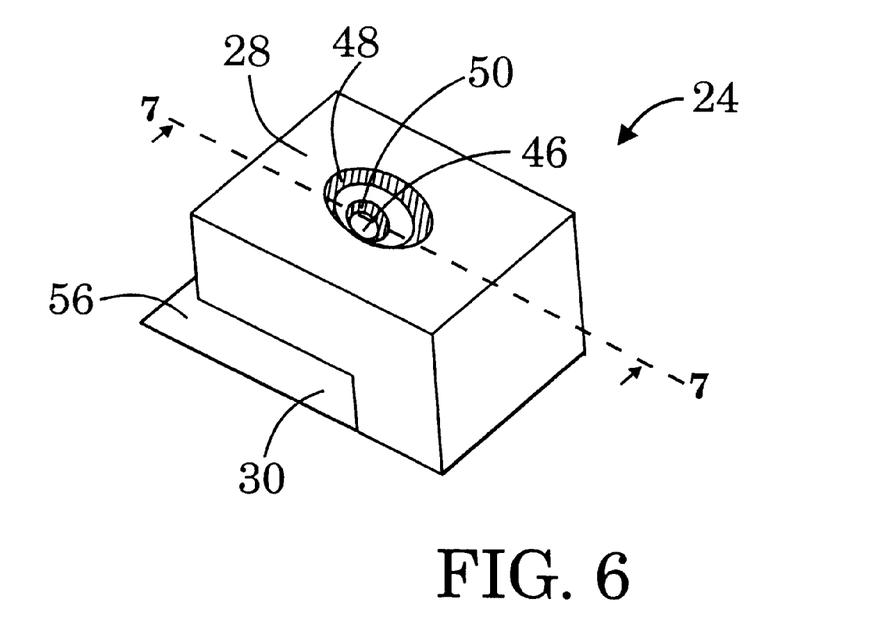
FIG. 6 is a perspective view of the hook shown in FIG. 3.

Please refer to FIG. 6. FIG. 6 is a perspective view of the hook 24. The plate structure 28 of the hook 24 comprises an injection hole 46. Before the key cap 32 and the link bar 40 are installed onto the top cover 22 of the key structure 20, grease can be injected into the horizontal sliding slot 30 through the injection hole 46 to reduce the friction between the lower ends 44 of the link bar 40 and the horizontal sliding slots 30 when the link bar 40 slides horizontally in the horizontal sliding slots 30.

Figure 7:
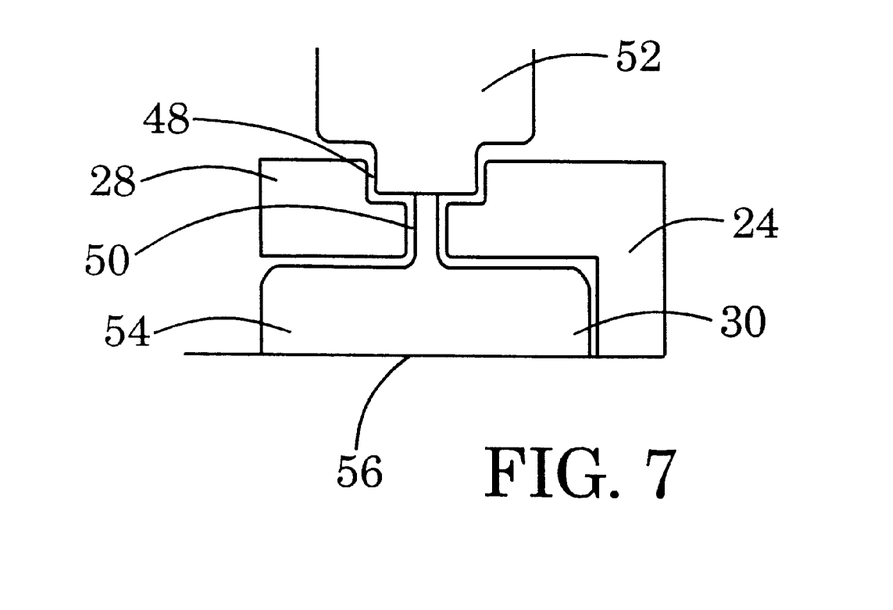
FIG. 7 is a sectional view along line 7—7 of the hook in FIG. 6.

Please refer to FIG. 7. FIG. 7 is a sectional view along line 7—7 of the hook 24 when injecting grease 54 by inserting a needle shaped injection head 52 into the injection hole 46 through the top 48 of the injection hole 46. The injection hole 46 in the plate structure comprises a top section and a bottom section over which the top section is larger than the bottom section such that the injection head 52 cannot penetrate the bottom 50 of the injection hole 46. The grease 54 inside the injection head 52 will flow into the horizontal sliding slot 30 through the bottom 50 of the injection hole 46, and will thus grease a horizontal surface 56 at the bottom of the horizontal sliding slot 30 and a bottom side of the plate structure 28.

Figure 8:
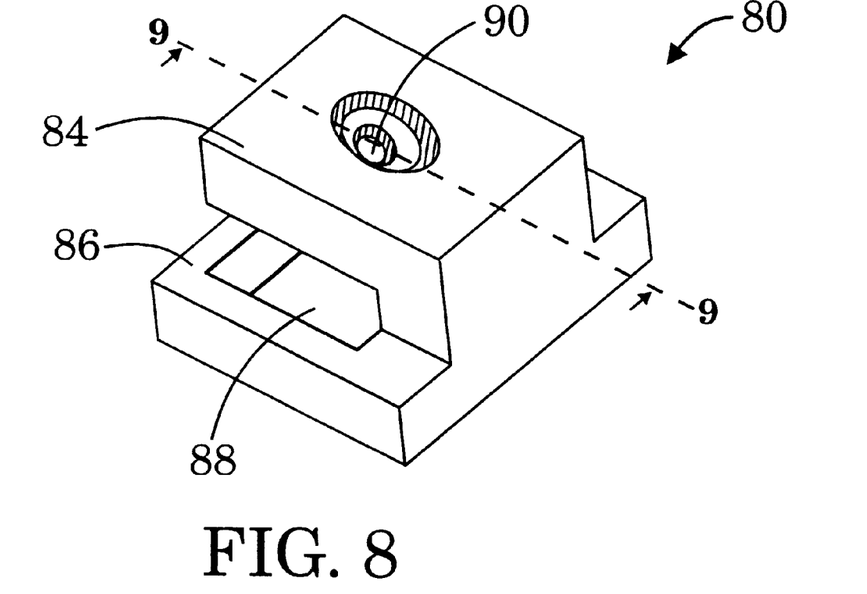
FIG. 8 is a perspective view of an alternative hook according to the present invention.

Please refer to FIG. 8. FIG. 8 is a perspective view of an alternative hook 80 of the key structure 20 according to the present invention. The hook 80 comprises a horizontal sliding slot 82, a plate structure 84 on its top, and a horizontally installed supporting base 86 at its bottom. The supporting base 86 comprises a bottom opening 88 within which a grease stopper 96 may be positioned. The plate structure 84 comprises an injection hole 90 through which grease 94 is injected into the horizontal sliding slot 82.

Figure 9:
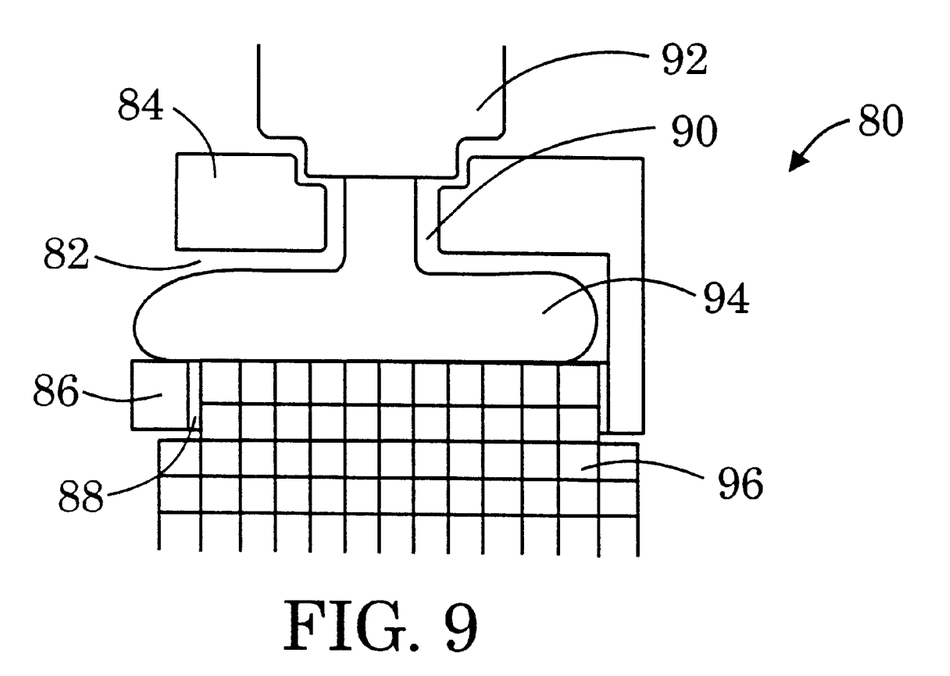
FIG. 9 is a sectional view along line 9—9 of the hook in FIG. 8.

Please refer to FIG. 9. FIG. 9 is a sectional view along line 9—9 of the hook 80 when injecting the grease 94. Before the key cap 32 and the link bar 40 are installed onto the top cover 22 of the key structure 20, a grease stopper 96 is inserted to seal the bottom opening 88 of the hook 80, and the grease 94 is injected into the horizontal sliding slot 82 through the injection hole 90 to fill spaces between the plate structure 84 and the grease stopper 96 and grease the bottom side of the plate structure 84 and the supporting base 86.

Figure 10:
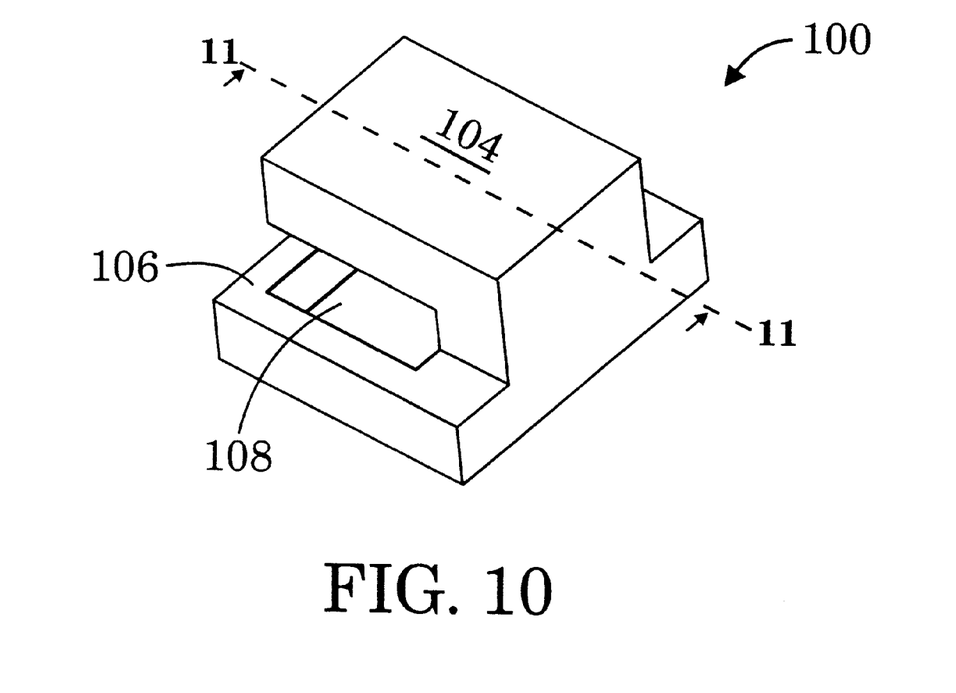
FIG. 10 is a perspective view of the hook in FIG. 8 without an injection hole at its top.

Please refer to FIG. 10. FIG. 10 is a perspective view of a hook 100 without an injection hole at its top. The hook 100 comprises a horizontal sliding slot 102, a plate structure 104 on its top, and a horizontally installed supporting base 106 on its bottom. The supporting base 106 comprises a bottom opening 108 in which a grease stopper 114 is positioned. The difference between hooks 100 and 80 is that the plate structure 104 of the hook 100 lacks an injection hole at its top.

Figure 11:
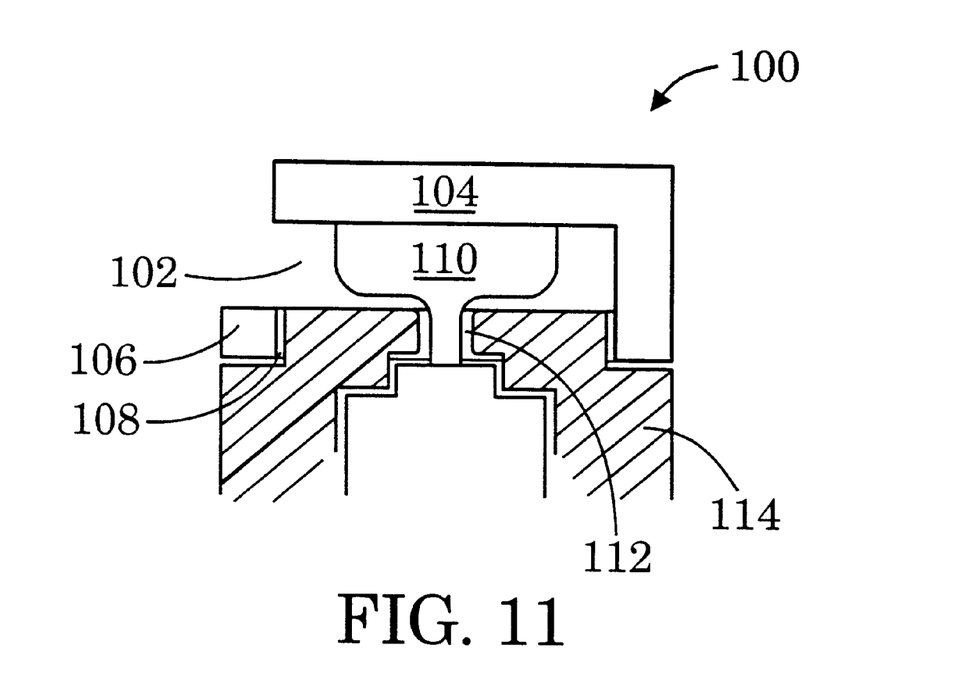
FIG. 11 is a sectional view along line 11—11 of the hook in FIG. 10.

Please refer to FIG. 11. FIG. 11 is a sectional view along line 11—11 of the hook 100 when injecting grease 110. Before the key cap 32 and the link bar 40 are installed onto the top cover 22 of the key structure 20, a grease stopper 114 comprising an injection hole 112 is inserted to seal the bottom opening 108 of the hook 100, and the grease 110 is injected into the horizontal sliding slot 102 of the hook 100 through the injection hole 112 to fill the spaces between the plate structure 104 and the grease stopper 114 and to grease the bottom side of the plate structure 104 and the supporting base 106.

Figure 12:
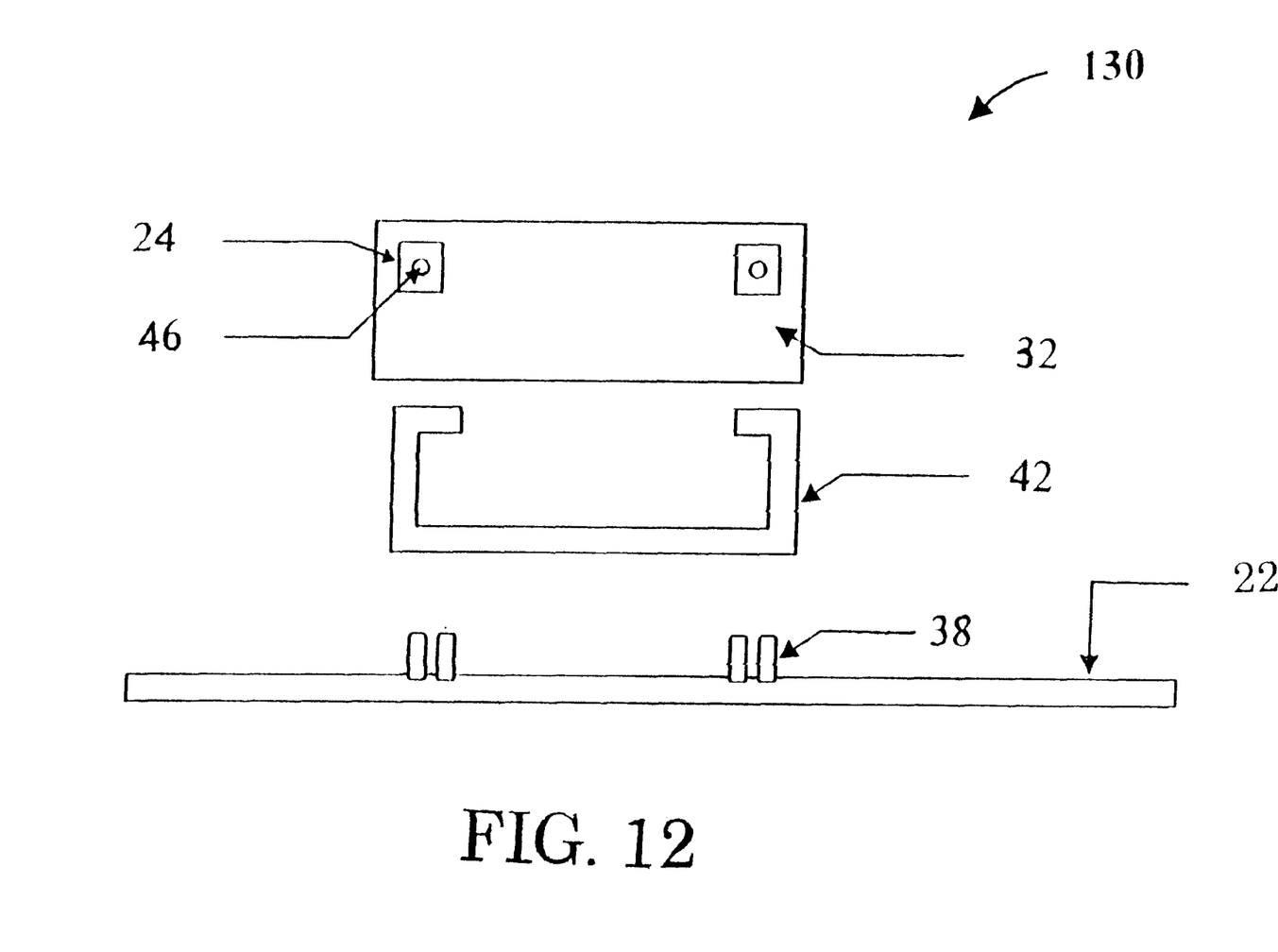
FIG. 12 is another embodiment of a key structure according to the present invention.

Please refer to FIG. 12. FIG. 12 is a perspective view of another key structure 130 according to the present invention. The key structure 20 in FIG. 3 has the hooks 24 installed on the top cover 22, and two clamps 38 installed inside the key cap 32 for separately fixing the link bar 42 at the top and bottom sides of the key structure 20. In the key structure 130, on the other hand, the link bar 42 is positioned upside down. This is achieved by installing the hooks 24 onto the inner side of the key cap 32 and the two clamps 38 onto the top cover 22. In this key structure 130 with the upside down link bar 42, the plate structure 28 of each hook 24 is installed at the bottom of the hook 24, and forms a horizontal sliding slot 30 with the key cap 32. This will facilitate the injection of grease into the horizontal sliding slot 30 of the key structure 130. The key structure 130 will work best if installed with the hook 24 shown in FIGS. 6 and 7. The plate structure 28 of the hook 24 comprises an injection hole 46 for injecting the grease into the horizontal sliding slot 30. The hook 80 in FIGS. 8 and 9 or the hook 100 in FIGS. 10 and 11 must not be used because the bottom openings 88 and 108 for inserting the grease stoppers 96, 114 will leave openings on the surface of the key cap 32 therefore allowing unwanted substances to enter the key structure 130.

Unlike the prior art hooks 12, the hooks 24, 80, 100 comprise injection holes for the injection of grease. Thus, the grease can be easily injected into the horizontal sliding slots of the hooks 24, 80, 100 through the injection holes at the plate structures or the bottom openings of the hooks without having to move a small stick inside the horizontal sliding slots up-and-down. This makes the installation of the key structures a very simple task.

Those skilled in the art will readily observe that numerous modifications and alterations of the device may be made while retaining the teachings of the invention. Accordingly, the above disclosure should by construed as limited only by the metes and bounds of the appended claims.

What is claimed is:

1. A key structure of a keyboard comprising:
   a top cover;
   a key supporting structure installed on the top cover;
   two hooks installed on the top cover positioned on two opposite sides of the key supporting structure, each of the hooks comprising a plate structure on its top and a horizontal sliding slot under the plate structure;
   a key cap having a bottom side movably connected to the key supporting structure in an up-and-down manner, the key cap further comprising two clamps on its bottom side;
   a link bar comprising two upper ends and two lower ends integrally built together, the two upper ends being rotatably installed in the two clamps on the bottom side of the key cap, the two lower ends being separately installed in the horizontal sliding slots of the two hooks on the top cover in a slidable manner, the link bar being used for maintaining balance of the key cap when the key cap is depressed;
   wherein the plate structure of at least one of the two hooks comprises an injection hole through which grease can be injected into the horizontal sliding slot under the plate structure so as to reduce the friction between the horizontal sliding slot and the lower end of the link bar in the horizontal sliding slot.

2. The key structure of claim 1 wherein the injection hole in the plate structure comprises a top section and a bottom section over which the top section is larger than the bottom section such that a needle-shaped injection head containing grease may be inserted through the top section but not the bottom section of the injection hole and the grease can be injected into the horizontal sliding slot under the plate structure through the bottom section of the injection hole.

3. The key structure of claim 1 wherein the supporting structure comprises a vertical sliding slot positioned between the two hooks, and a sliding rod vertically installed inside the vertical sliding slot in an up-and-down slidable manner.

4. The key structure of claim 3 wherein the key cap comprises a rectangular-shaped recess defined by two long sides and two short sides on its bottom side, the sliding rod of the key supporting structure is installed at a middle portion of the recess, and the two clamps are installed on one of the long sides of the recess.

5. The key structure of claim 1 wherein the supporting structure is a scissors-shaped frame positioned between the two hooks in an up-and-down moveable manner, and the key structure further comprises a plurality of clasps mounted on the bottom side of the key cap for securing the key cap on the scissors-shaped frame.

6. The key structure of claim 1 wherein each of the hooks comprises a horizontal surface on the bottom side of its horizontal sliding slot wherein the grease injected into the horizontal sliding slot will grease both the bottom side of the plate structure and the horizontal surface.

\* \* \* \* \*